(12) United States Patent
Kim

(10) Patent No.: US 7,911,354 B2
(45) Date of Patent: Mar. 22, 2011

(54) INDUCTIVE POSITION SENSOR

(75) Inventor: Gi Yeop Kim, Seongnam (KR)

(73) Assignee: KSR Technologies Co., Ridgetown (CA)

( * ) Notice: Subject to any disclaimer, the term of this patent is extended or adjusted under 35 U.S.C. 154(b) by 329 days.

(21) Appl. No.: 12/325,648

(22) Filed: Dec. 1, 2008

(65) Prior Publication Data
US 2009/0153344 A1   Jun. 18, 2009

Related U.S. Application Data

(60) Provisional application No. 61/013,158, filed on Dec. 12, 2007.

(51) Int. Cl.
*G08B 21/00* (2006.01)
(52) U.S. Cl. ............... 340/686.1; 340/545.2; 340/545.4; 340/565; 340/572.8
(58) Field of Classification Search ............... 340/686.1, 340/541, 545.2, 545.4, 565, 572.8
See application file for complete search history.

(56) References Cited

U.S. PATENT DOCUMENTS

| | | | |
|---|---|---|---|
| 6,175,232 B1 * | 1/2001 | De Coulon et al. | 324/207.12 |
| 6,384,598 B1 * | 5/2002 | Hobein et al. | 324/207.17 |
| 7,292,026 B2 * | 11/2007 | Lee | 324/207.17 |
| 2009/0079422 A1 * | 3/2009 | Lee | 324/207.16 |

FOREIGN PATENT DOCUMENTS

| | | |
|---|---|---|
| EP | 0909955 A2 | 4/1999 |
| EP | 1225426 A2 | 7/2002 |
| WO | WO-2005/098370 A1 | 10/2005 |
| WO | WO-2006/106422 A2 | 10/2006 |

* cited by examiner

*Primary Examiner* — Daryl Pope
(74) *Attorney, Agent, or Firm* — Gifford, Krass, Sprinkle, Anderson & Citkowski, P.C.

(57) ABSTRACT

A position sensor having a circular transmitter coil which generates electromagnetic radiation when excited by a source of alternating electrical energy. A receiver coil has a first loop wound in a first direction around a portion of the transmitter coil and a second loop wound in a second direction opposite from the first direction around a diametrically opposed portion of the transmitter coil. In addition the receiver coil includes a first compensating coil wound in the second direction inside the first portion of the transmitter coil as well as a second compensating coil wound in the first direction inside the second portion of the transmitter coil. The first and second loops and the first and second compensating coils of the receiver coil are electrically connected in series with each other. A movable coupler element varies the inductive coupling between the transmitter coil and the receiver coil as a function of the position of the coupler to thereby vary the electrical output signal from the receiver coil when excited by the transmitter coil.

6 Claims, 3 Drawing Sheets

INDUCTIVE POSITION SENSOR

CROSS-REFERENCE TO RELATED APPLICATIONS

This application claims priority of U.S. Provisional Patent Application Ser. No. 61/013,158 filed Dec. 12, 2007, which is incorporated herein by reference.

BACKGROUND OF THE INVENTION

I. Field of the Invention

The present invention relates generally to position sensors and, more particularly, to an inductive position sensor.

II. Description of Related Art

In automotive vehicles, the throttle pedal has traditionally been mechanically connected to the engine throttle by a cable. However, in more modern vehicles a throttle position sensor is mechanically connected to the pedal and generates an electrical output signal indicative of the position of the throttle pedal which varies as the throttle pedal is depressed by the driver. Such systems are sometimes referred to as "fly by wire" systems.

In one type of previously known throttle position sensor, the sensor includes a circularly wound transmitter coil typically formed on a printed circuit board. This transmitter coil is excited by high frequency alternating source so that the transmitter coil generates electromagnetic radiation. Even though the transmitter coil is usually arranged in a circular pattern, other pattern configurations may alternatively be used.

A receiver coil is also formed on the printed circuit board in close proximity to the transmitter coil. This receiver coil receives electromagnetic radiation from the transmitter coil through inductive coupling and generates an output signal as a result of the signal received from the transmitter coil.

Unlike the transmitter coil, however, the receiver coil includes a first loop and a second loop that are wound in the opposite direction when viewed in plan. Consequently, the inductive coupling between the transmitter coil and the first loop of the receiver coil generates a voltage opposite in polarity from the inductive coupling between the transmitter coil and the second loop of the transmitter coil. The receiver output is then a combination or sum of the signals from the first and second loops of the transmitter coil which are connected in series with each other.

In order to generate an output signal representative of the position of the throttle, a coupler element is rotatably mounted within the throttle position sensor and rotates in synchronism with the depression and release of the throttle pedal. This coupler element, furthermore, is constructed of a conductive material, such as metal, which cancels magnetic flux received from the transmitter coil.

The coupler element overlies a portion of both the transmitter and the receiver coils. Consequently, during energization of the transmitter coil and upon rotation of the coupler element, the inductive coupling between the transmitter coil and the first and second loops of the receiver coil is varied. This variable inductive coupling thus produces a voltage output from the receiver coil indicative of the angular position of the coupler element, and thus the position of the throttle pedal.

In order to obtain an accurate signal from these previously known throttle position sensors, it is important that the coupler element be concentric with the transmitter and receiver coils and also that the space between the coupler element and the transmitter and receiver coils remain constant throughout the entire movement of the coupler element. However, due to manufacturing tolerances in the manufacture of the throttle position sensor, the coupler element often is not precisely concentric with the transmitter and receiver coils and/or the space between the coupler element and the transmitter and receiver coils varies somewhat during pivotal movement of the coupler element. This lack of concentricity between the coupler element and the transmitter and receiver coils, as well as a variation in the spacing between the coupler element and the receiver and transmitter coils during rotation of the coupler element, will vary the inductive coupling between the transmitter coil and the first and second loops of the receiver coil and thus produce an output signal from the receiver coil different from a throttle position sensor with a precisely positioned coupler element at the same angular position.

SUMMARY OF THE PRESENT INVENTION

The present invention provides a throttle position sensor which overcomes the above-mentioned disadvantages of the previously known throttle position sensors.

In brief the throttle position sensor of the present invention includes a transmitter coil which is preferably wound in a circular configuration. The transmitter coil is excited by a high frequency alternating current source so that, when energized, the transmitter coil generates electromagnetic radiation. Additionally, the transmitter coil is preferably formed on a printed circuit board.

A receiver coil is also formed on the printed circuit board in close proximity to the transmitter coil. Unlike the transmitter coil, however, the receiver coil includes four distinct coil sections which are interconnected in series with each other. These four distinct coil sections include a first and second oppositely wound loop and two oppositely wound compensating coils.

The first loop of the receiver coil is positioned around a first portion of the transmitter coil while, similarly, the second loop of the receiver coil is positioned around a diametrically opposed second portion of the transmitter coil. The first compensating coil is positioned inside the first portion of the transmitter coil but is wound in the second direction, i.e. the same direction as the second loop of the receiver coil. Conversely, the second compensating coil is positioned inside of the second portion of the transmitter coil and is wound in the first direction, i.e. the same direction as the first loop of the receiver coil.

The first and second loops of the receiver coil as well as the first and second compensating coils are positioned sufficiently close to the transmitter coil so as to be inductively coupled to the transmitter coil. However, since the first and second loop and first and second compensating coils are connected in series with each other, the sum of the voltages from the first and second loop and compensating coils of the receiver coil form the output signal from the throttle position sensor.

A coupler element is movably positioned relative to the transmitter and receiver coil and varies the inductive coupling between the transmitter coil and the receiver coil as a function of the angular position of the coupler element. Preferably, the coupler element is rotatably mounted about an axis concentric with the axis of both the transmitter coil and receiver coil. Furthermore, the coupler element is shaped so that rotation of the coupler element varies the amount that the coupler element overlies both the first and second loop of the receiver coil, and thus the output signal from the receiver coil.

In practice, the first and second compensating coils of the receiver coil compensate for errors in the alignment of the coupler element rotational axis with the axis of the transmitter and receiver coil, as well as variations in spacing between the coupler element and the transmitter and receiver coils. As will subsequently be described in greater detail, the first and second compensating coils of the receiver coil will compensate for small misalignment of the coupler element with the axis of the transmitter and receiver coil, as well as variations in the spacing between the coupler element and the transmitter and receiver coils. For example, a reduction in the inductive coupling between the transmitter coil and the first loop of the receiver coil caused by a misalignment of the coupler element is offset by a decrease in the inductive coupling between the first compensating coil which is wound in the same direction as the second loop of the receiving coil. The converse is also true.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
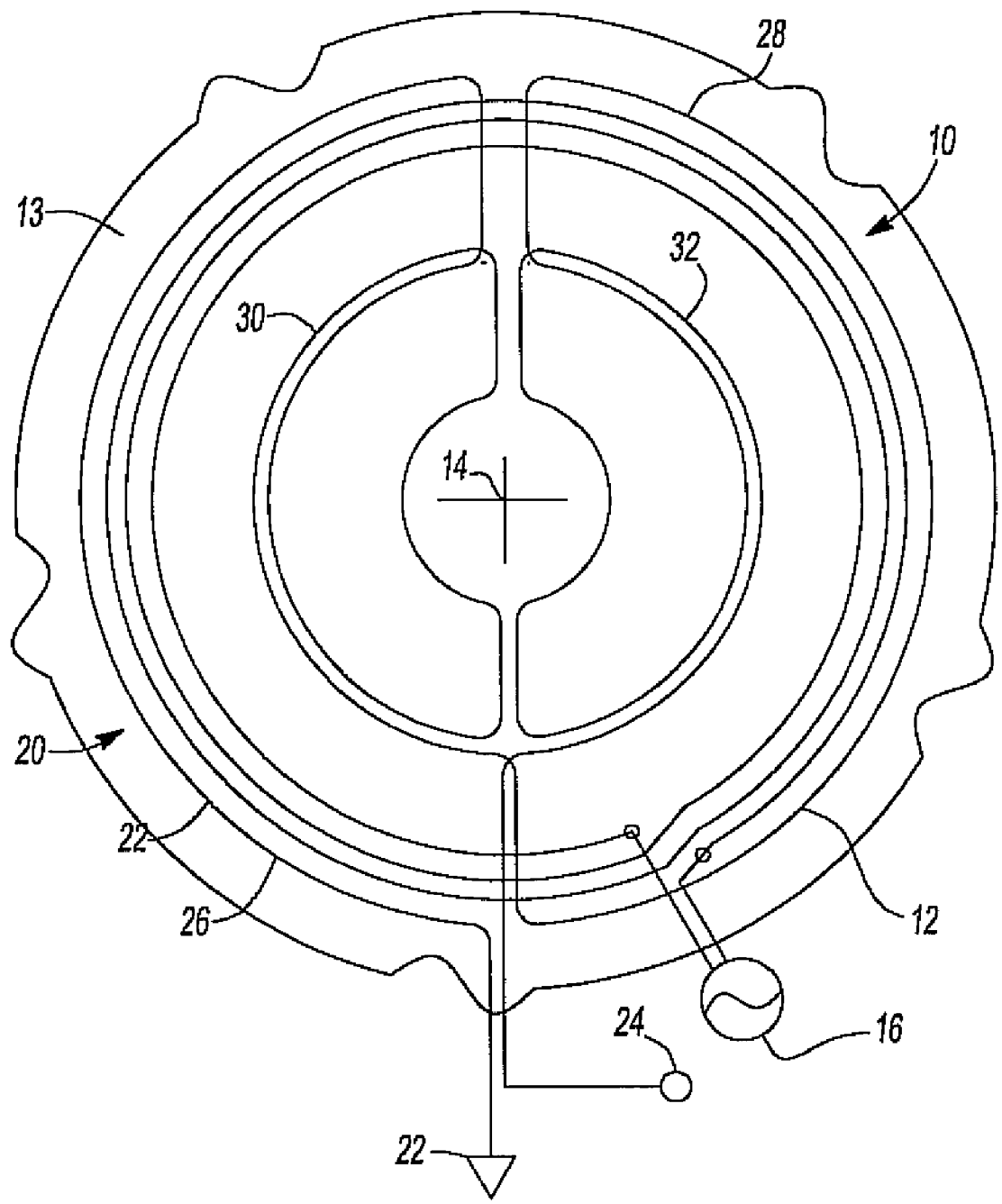
FIG. 1 is a diagrammatic plan view illustrating a preferred embodiment of the present invention but with parts removed for clarity.

With reference first to FIG. 1, a throttle position sensor 10 in accordance with the present invention is there shown schematically. The throttle position sensor 10 includes a transmitter coil 12 printed on a printed circuit board 13. The transmitter coil 12 includes at least one, and preferably several circular loops formed substantially concentrically around an axis 14 of the sensor 10.

A high frequency alternating current source 16 is electrically connected to the ends of the transmitter coil 12. Thus, when the high frequency alternating current source 16 is activated, the transmitter coil 12 generates electromagnetic radiation at the frequency of the high frequency alternating current source 16.

A receiver coil 20 is also printed on the printed circuit board 13 and this receiver coil 20 has two ends 22 and 24 which form the output signal from the sensor 10. The receiver coil 20 includes a first loop 26 which is wound in a first direction around substantially one-half of the outer periphery of the transmitter coil 12. A second loop 28 of the receiver coil 20 is wound in a second direction opposite from the first direction about the outer periphery of the transmitter coil 12 and in a position diametrically opposed from the first loop 26.

The receiver coil further includes a first compensating coil 30 which is positioned inside the transmitter coil 12 on the same half of the transmitter coil 12 as the first loop 26. This compensating coil 30, however, is wound in the same direction as the second loop 28 of the receiver coil and thus opposite from the direction of the first loop 20 of the receiver coil. Similarly, a second compensating coil 32 is positioned inside the transmitter coil 12 diametrically opposed from the first compensating coil 30. This second compensating coil 32 is wound in the same direction as the first loop 26 of the receiver coil 20 and thus in the opposite direction than the second loop 28 of the receiver coil 20.

Both loops 26 and 28 as well as both compensating coils 30 and 32 are concentrically formed on the printed circuit board 13 around the axis 14 of the sensor 10. Furthermore, the first loop 26 and first compensating coil 30 of the receiver coil 20 form substantially a mirror image of the second loop 28 and second compensating coil 32 of the receiver coil 20.

Both loops 26 and 28 of the receiver coil 20 as well as both compensating coils 30 and 32 are printed on the printed circuit board 13. Furthermore, the first and second loops 26 and 28 as well as the first and second compensating coils 30 and 32 are connected in series with each other so that the entire receiver coil 20 consists of a single wire having the two ends 22 and 24.

Because the loops 26 and 28 of the receiver coil 20 are oppositely wound from each other, the voltage induced in the loops 20 and 28 by the transmitter coil 12 will be opposite in polarity from each other. Likewise, since the compensating coils 30 and 32 are also oppositely wound, the voltage induced in the compensating coils 30 and 32 by the transmitter coil 12 when energized will also be opposite in polarity from each other. Similarly, the polarity of the voltage in the first loop 26 of the receiver coil 20 is opposite from the induced voltage in the first compensating coil 30 while the voltage induced in the second loop 28 of the receiver coil 20 is opposite in polarity from the voltage induced in the second compensating coil 32. Consequently, the voltage at the output terminals 22 and 24 of the receiver coil 20 equals the sum of the induced voltages in the first and second loops 26 and 28 as well as the first and second compensating coils 30 and 32 of the receiver coil 20.

Figure 2:
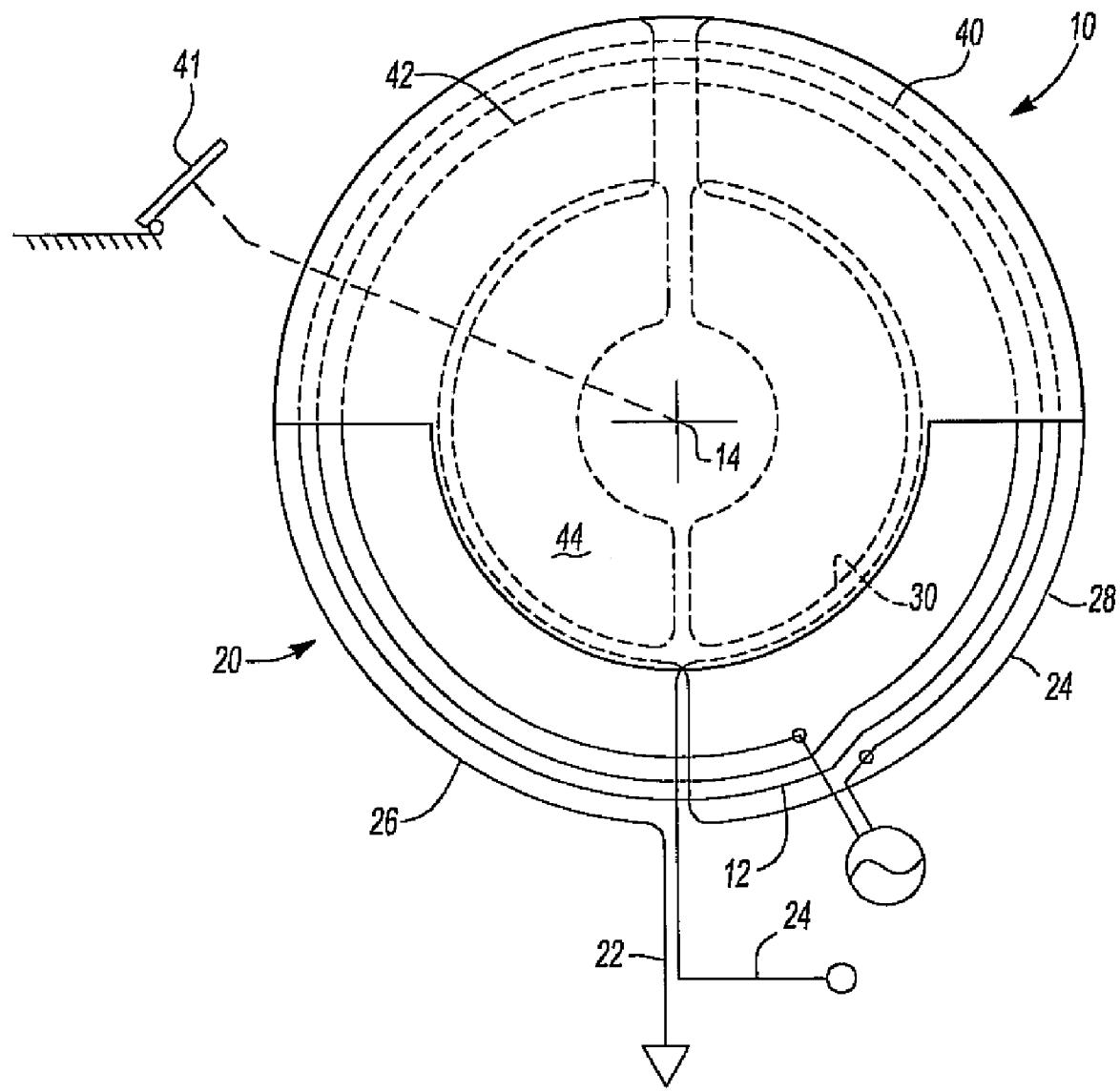
FIG. 2 is a view similar to FIG. 1, but illustrating a coupler element disposed over the transmitter and receiver coils.

With reference now to FIG. 2, a coupler element 40 is rotatably mounted to the sensor 10 about the axis 14 of the sensor housing. This coupler element 40 is constructed of a material, e.g. metal, which produces eddy currents in response to electromagnetic radiation produced by the transmitter coil 12.

The coupler element 40 includes a semicircular section 42 which, as shown in FIG. 2, overlies a portion of both the first and second loops 26 and 28 of the receiver coil 20. The coupler element 42 also includes a circular section 44 which completely overlies the compensating coils 30 and 32 when the coupler element 40 is precisely concentric with the axis 14 of the sensor 10.

The coupler element thus varies the inductive coupling between the transmitter coil 12 and the first loop 26 and second loop 28 of the receiver coil 20 depending upon the angular position of the coupler element 40 relative to the sensor 10. The coupler element 40 is mechanically connected to a throttle pedal 41 for the vehicle so that the angular position of the coupler element 40 varies proportionately with the position of the throttle pedal 41.

For example, the coupler element 40 illustrated in FIG. 2 is shown at a neutral position in which the semicircular portion 42 of the coupler element 40 overlies an equal portion of both the first loop 26 and the second loop 28 of the receiver coil 20. Consequently, in this position, the voltage induced by the transmitter coil 12 in the first loop 26 will be equal to but opposite in polarity from the voltage induced in the second loop 28 of the receiver coil 20. As such, the voltage induced between the output terminals 22 and 24 of the receiver coil 20 would be zero. However, if the coupler element 40 is rotated, for example, in a clockwise direction, the inductive coupling between the transmitter coil 12 and the first loop 26 of the receiver coil 20 increases while, simultaneously, the inductive coupling between the transmitter coil 12 and the second loop 28 of the receiver coil 20 decreases. This, in turn, produces a voltage at the output terminals 22 and 24 of the receiver coil that varies in an amount proportional to the angular position of the coupler element 40 about the sensor axis 14.

When the coupler element 40 is precisely mounted concentrically with the axis 14 of the sensor 10, the circular portion 44 of the coupler element 40 completely and equally overlies both compensating coils 30 and 32. As such, the voltage induced in the first compensating coil 30 by the transmitter coil 12 is equal to but opposite in polarity from the voltage induced by the transmitter coil in the second compensating coil 32. Consequently, the induced voltage from the two coils 30 and 32 offset each other.

Figure 3:
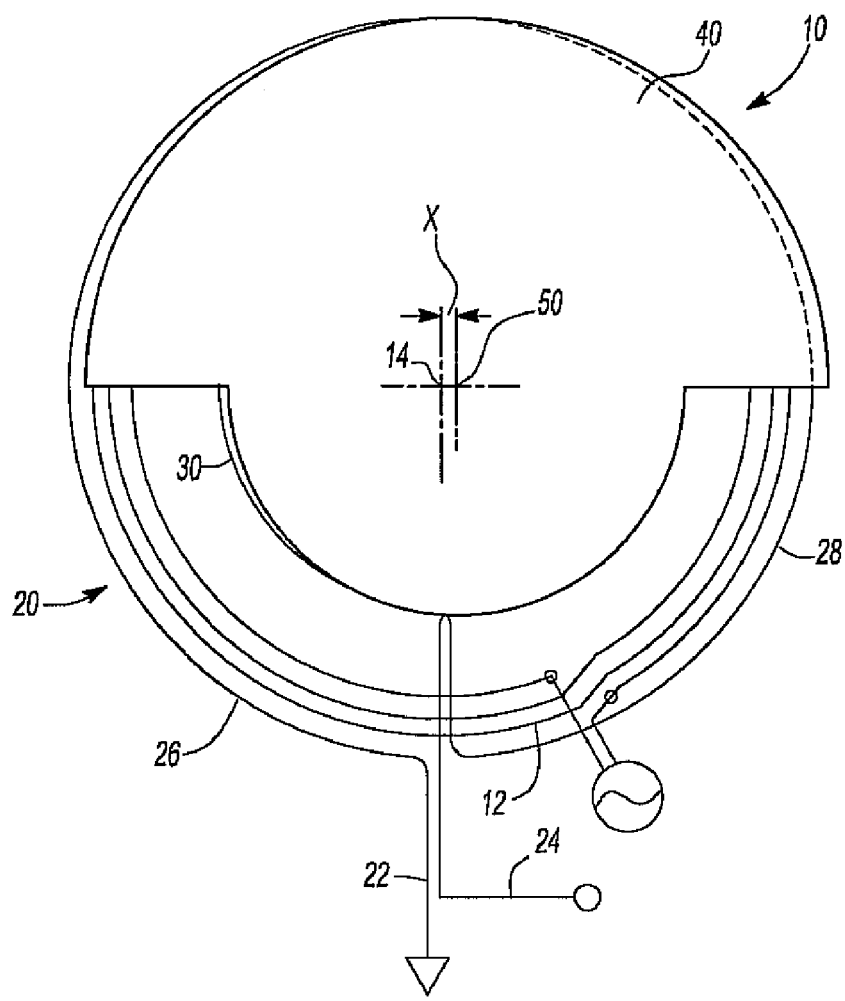
FIG. 3 is a view similar to FIG. 2, but illustrating the coupler element misaligned with respect to the axis of the sensor.

However, due to manufacturing tolerances, the coupler element 40 is not always precisely aligned with the axis of the sensor 10. With reference then to FIG. 3, the sensor 10 is there shown in exaggeration in which the coupler element 40 is not concentric with the housing axis 14, but rather mounted on an axis 50 offset from the axis 14 by a small amount X shown in exaggeration in FIG. 3. Due to the rightward shift of the coupler element 40 as viewed in FIG. 3, the coupler element 40 no longer covers the entire first loop 26 of the receiver coil 20 thus diminishing the effect of the coupler element 40 on the first loop 26. Simultaneously, however, the effect of the coupling element 40 on the first compensating coil 30 is also diminished so that the voltage induced in both the first loop 26 as well as the first compensating coil 30 of the receiver coil 20 by the transmitter coil 12 increases. However, since the first loop 26 of the receiver coil 20 is oppositely wound from the first compensating coil 30, the increase of the induced voltage in the first loop 26 is automatically offset by an increase of the induced voltage in the first compensating coil 30 of opposite polarity thus negating, or at least minimizing, the effect on the output voltage at the receiver coil terminals 22 and 24 caused by the misalignment of the coupler element axis with respect to the sensor housing axis 14.

Figure 4:
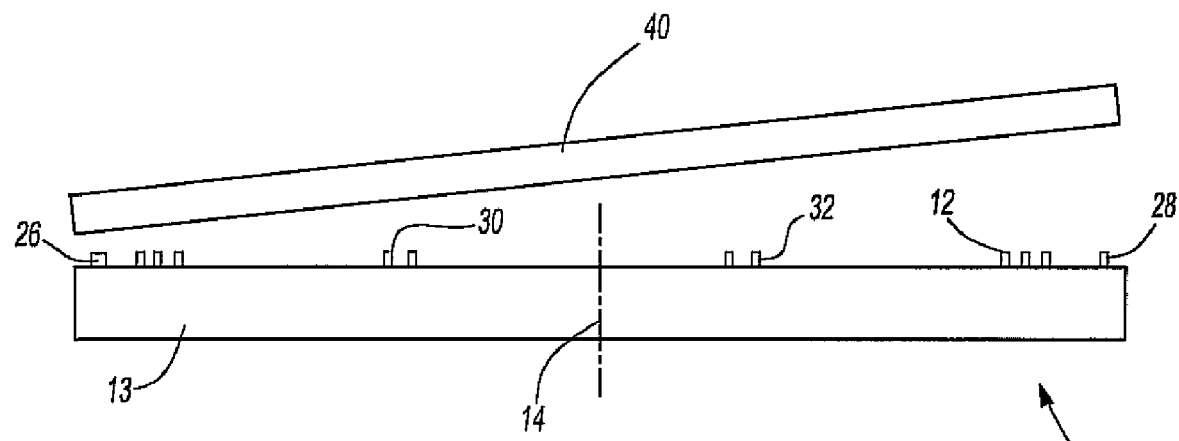
FIG. 4 is a side view illustrating a position sensor of the present invention in which the coupler element is tilted with respect to the transmitter and receiver coils.

With reference now to FIG. 4, in the event that the coupler element 40 is tilted with respect to the transmitter coil and receiver coil 12, as shown in great exaggeration in FIG. 4, the increased impact of the coupler element 40 on the first loop 26 of the receiver coil 20 is offset by the increased impact of the coupler element 40 on the first compensating coil 30. Likewise, the reduced impact of the coupler element 40 on the second loop 28 of the receiver coil 20 is offset by the reduced impact of the coupler element 40 on the second compensating coil 32 due to the increased spacing between the second receiver loop 28 and second compensating coil 32 relative to the coupler element 40.

From the foregoing, it can be seen that the present invention provides a position sensor, particularly well suited as a throttle position sensor, which provides for automatic compensation of both misalignment of the coupler element as well as tilting of the coupler element relative to the transmitter and receiver coils. Having described the invention, however, many modifications will become apparent to those skilled in the art to which it pertains without deviation from the spirit of the invention as defined by the scope of the appended claims.

I claim:

1. A position sensor comprising:
    a circular transmitter coil which generates electromagnetic radiation when excited by a source of electrical energy,
    a receiver coil having a first loop wound in a first direction around a first portion of said transmitter coil, a second loop wound in a second direction opposite from said first direction around a second diametrically opposed portion of said transmitter coil, a first compensating coil wound in said second direction inside said first portion of said transmitter coil and a second compensating coil wound in said first direction inside second portion of said transmitter coil, said first loop, said second loop, said first compensating coil and said second compensating coil being connected in series, said receiver coil generating an electrical output signal when said transmitter coil is excited due to inductive coupling between said transmitter coil and said receiver coil, and
    a movable coupler element which varies the inductive coupling between said transmitter coil and said receiver coil as a function of the position of said coupler element to thereby vary the electrical output signal from said receiver coil when excited by said transmitter coil.

2. The invention as defined in claim 1 wherein said transmitter coil is formed on a printed circuit board.

3. The invention as defined in claim 1 wherein said receiver coil is formed on a printed circuit board.

4. The invention as defined in claim 1 wherein said coupler element is metallic and rotatable relative to said transmitter coil.

5. The invention as defined in claim 1 wherein said coupler element is rotatable about an axis relative to said transmitter coil.

6. The invention as defined in claim 1 wherein said transmitter coil comprises a plurality of concentric circular loops.

* * * * *